United States Patent [19]

Osgood, Sr.

[11] Patent Number: 4,825,600

[45] Date of Patent: May 2, 1989

[54] GARDEN COVER RETAINER OR CONCRETE COVER RETAINER

[75] Inventor: Almond A. Osgood, Sr., 269 Main St., West Newbury, Mass. 01985

[73] Assignee: Almond Osgood, West Newbury, Mass.

[21] Appl. No.: 29,063

[22] Filed: Mar. 23, 1987

[51] Int. Cl.$^4$ .................................................. E04D 1/34
[52] U.S. Cl. ........................................... 52/4; 52/155; 135/118
[58] Field of Search ...................... 52/4, 155, 159, 712, 52/410, 713, 358, 361, 362; 135/118

[56] References Cited

U.S. PATENT DOCUMENTS 1,855,896  4/1932  Venzie ................................. 52/713

FOREIGN PATENT DOCUMENTS 10173 of 1910 United Kingdom ................ 135/118

Primary Examiner—Carl D. Friedman
Attorney, Agent, or Firm—Robert F. O'Connell

[57] ABSTRACT

This invention is a hold-down retainer, including a pair of wires pivoted together at their centers, one wire having one straight end for insertion into ground or concrete, and the other having legs to bear against a cover on the ground or concrete.

7 Claims, 1 Drawing Sheet

U.S. Patent
May 2, 1989
4,825,600
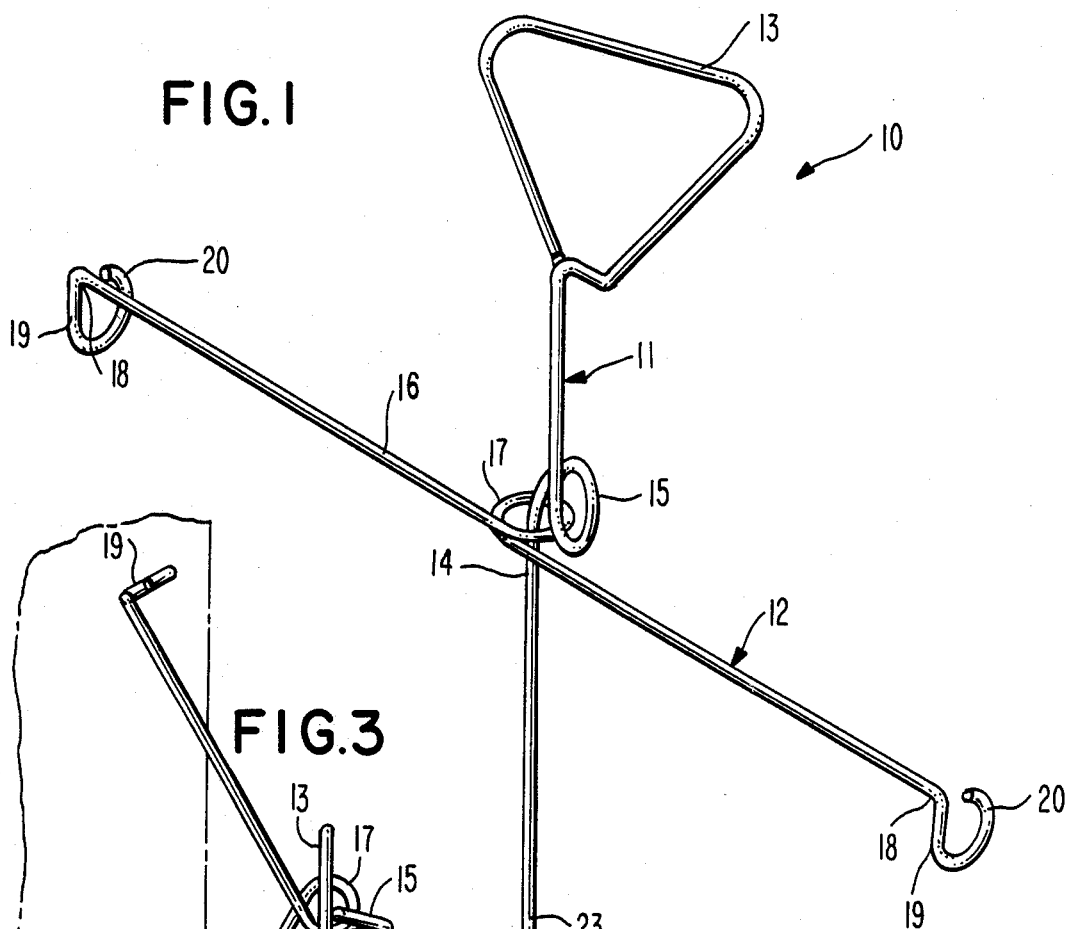
FIG. 1
FIG. 2
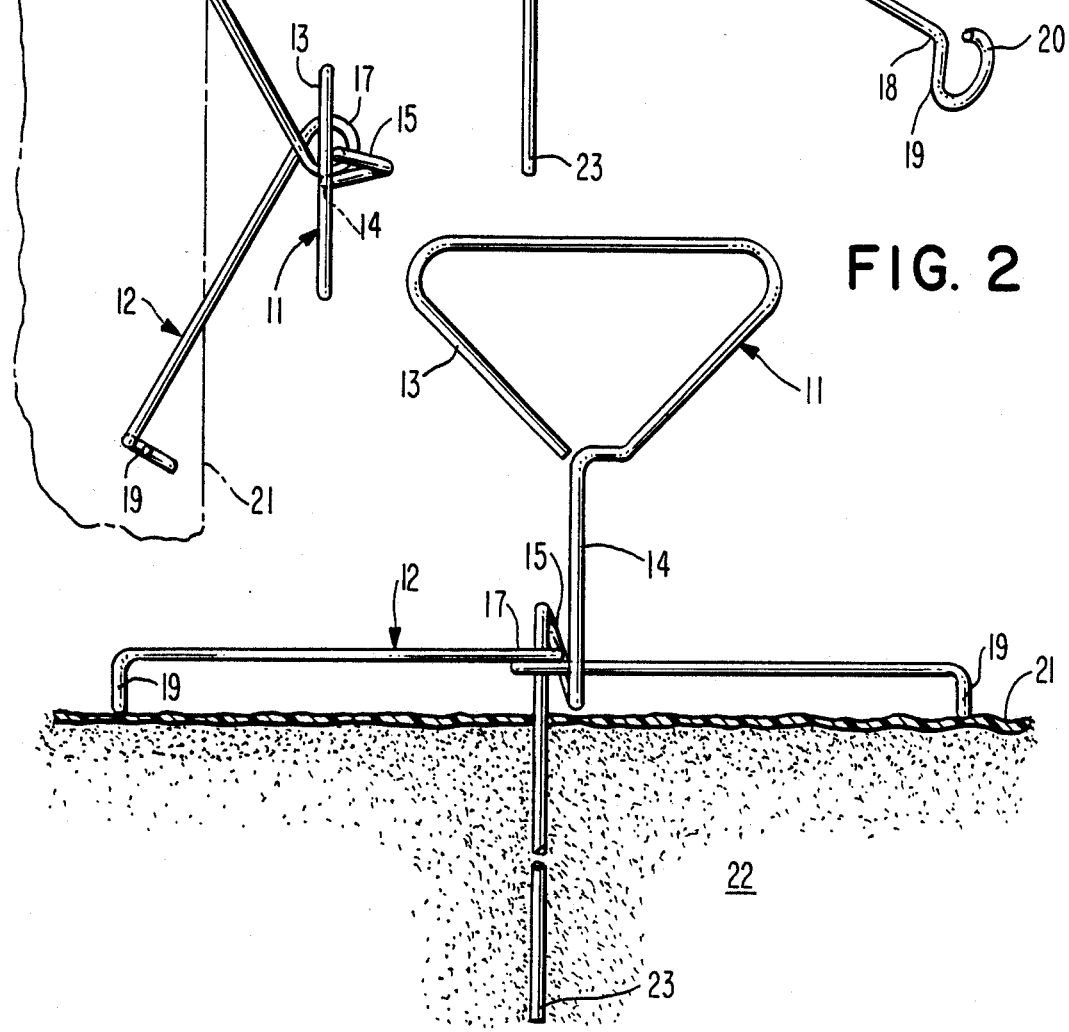
FIG. 3

GARDEN COVER RETAINER OR CONCRETE COVER RETAINER

BACKGROUND OF THE INVENTION

1. Field of the Invention

This invention relates generally to hold-down retainers. More specifically, it relates to retainers for anchoring down large outdoor covers, so that they are not blown away by the wind.

2. Description of Prior Art

It is well known, to those persons acquainted with outdoor concrete constructions, that, after concrete is poured, it must be protected from rain or snow until it has started to set, which usually takes a day to two. The typical protection is to cover it with a waterproof canvas, plastic sheet or the like, which, unless secured down, may easily blow away, exposing the concrete to possible weather damage. This situation is, accordingly, in need of an improvement.

SUMMARY OF THE INVENTION

Therefore, it is a principal object of the present invention to provide a concrete cover retainer, which holds down the cover even in a high wind.

Another object is to provide a concrete cover retainer, which is quick and easy to install.

Yet another object is to provide a retainer which is also suitable for anchoring covers placed over the ground to protect new seeds from weather or animals, before germination, while also preventing weed growth, and additionally providing a vapor barrier to the ground.

These, and other objects, will be readily evident, upon a study of the following Specification and the accompanying Drawing.

BRIEF DESCRIPTION OF THE DRAWINGS

FIG. 1 is a perspective view of garden/concrete cover retainer, shown in accordance with the present invention;

FIG. 2 is a front elevational view of the retainer as it would be used, and

FIG. 3 is a top plan view of another embodiment of FIGS. 1 and 2, except having angled rods for off-set situations.

DETAILED DESCRIPTION

Referring now to the Drawing in greater detail, and more particularly to FIGS. 1 and 2 thereof, at this time, the reference numeral 10 represents a garden cover retainer or concrete cover retainer, incorporating the invention, wherein there are a pair of copper wires 11 and 12 made from one-eighth inch diameter stock material.

The wire 11 includes a triangular-shaped handle 13, bent up at its one end, and the remainder thereof comprises a straight shank 14, which, near a mid-portion thereof, is bent up to form a circular loop 15. The wire, in its bent-up shape, measures almost twelve inches in length.

The wire 12 includes a straight shank 16 along its entire length, except at its center and at its opposite ends; the center being bent up to form a circular loop 17, and each opposite end being made with a right angle bend 18, so as to form parallel, downwardly straight legs 19, and the end of each leg being then bent semi-circularly to form a terminal loop 20; the flat planes of the two loops 20 being parallel to each other.

The two wires are connected to each other by the central loops 15 and 17 being hooked together.

In use, to retain the cover 21 against the surface of the concrete or ground 22, (as shown in FIG. 2), the end 23 of the shank 14 is inserted through the cover, and into the concrete or ground to a depth until the legs 19 rest against the cover and hold it down.

The wire 12 may be made in different lengths, such as one, two or three feet, which are selectively used, as needed, for the distance wanted between the legs 19.

In a modified design 24 of the invention, shown in FIG. 3, the central loop 17 of the wire 12 is not fully circular, so that the straight opposite end portions 25 of the shank 16 extend at an angle respective to each other, for preferred use in some situations.

This invention is ideal for use (1) as a line tie for laying out a driveway, (2) lining up lawn and cement sidewalks, and (3) staking out land boundaries.

While various other changes may be made in the detail construction, it is understood that such changes will be within the spirit and scope of the present invention, as is defined by the appended claims.

What I now claim is:

1. A garden cover retainer or concrete cover retainer, comprising, in combination, at least a pair of wires, each having a loopo substantially at the center thereof, the loops being interconnected so as to pivotally attach the wires together at their centers, one of said wires including means for securement to the ground or concrete, and the other of said wires including a pair of downward legs at opposite ends thereof to bear against a cover over the surface of said ground or concrete.

2. The combination as set forth in claim 1, wherein said means for securement to said ground or concrete comprises a straight shank for insertion therein.

3. The combination as set forth in claim 2, wherein the shank of the other of said wires comprises a substantially straight shank along its length.

4. The combination as set forth in claim 1, wherein said downward legs each include a further loop at the opposite end thereof.

5. The combination as set forth in claim 4, wherein the planes of said further loops are substantially parallel to each other.

6. The combination as set forth in claim 1, wherein the portions of the shank of the other of said wires which extend outwardly from said center loop lie at an angle with respect to each other.

7. The combination as set forth in claim 1, wherein said wires are copper wires.

* * * * *